United States Patent [19]

Tatsuzawa et al.

[11] 4,216,428
[45] Aug. 5, 1980

[54] PULSE SIGNAL RECEIVING SYSTEM EMPLOYING SPACE DIVERSITY

[75] Inventors: Yoshinobu Tatsuzawa, Yokohama; Masayuki Sakamoto, Yokosuka; Hiromi Wasai, Kyoto, all of Japan

[73] Assignees: Matsushita Electric Industrial Co., Ltd., Osaka; Nippon Telegraph & Telephone Public Corp., Tokyo, both of Japan

[21] Appl. No.: 906,196

[22] Filed: May 15, 1978

Related U.S. Application Data

[63] Continuation of Ser. No. 626,097, Oct. 28, 1975, abandoned.

[30] Foreign Application Priority Data

Oct. 29, 1974 [JP] Japan .................................. 49-125017

[51] Int. Cl.² ............................................... H04B 1/16
[52] U.S. Cl. ..................................... 375/75; 455/137; 455/273
[58] Field of Search .............................. 325/302–307, 325/366–369, 371, 372, 56; 343/113 DE

[56] References Cited

U.S. PATENT DOCUMENTS

| 2,375,126 | 5/1945 | Mathes | 325/307 |
| 2,375,126 | 11/1970 | Takagi | 325/307 X |
| 2,520,188 | 8/1950 | Yando | 325/307 |
| 3,382,499 | 5/1968 | Baud | 325/305 |

OTHER PUBLICATIONS

"Interference in Mobile Radio System", Report on Research & Development, vol. 11, No. 2, Matsushita Communications Industrial Co., pp. 1959–1962.

Primary Examiner—Terrell W. Fears
Assistant Examiner—Aristotelis M. Psitos
Attorney, Agent, or Firm—Stevens, Davis, Miller & Mosher

[57] ABSTRACT

A receiving system without antenna switching wherein signals received by two or more spaced antennas are heterodyned using local oscillation signals at frequencies spaced from each other by not less than the fundamental frequency of a modulating signal. The resultant intermediate frequency outputs are combined and detected to produce an output signal.

4 Claims, 5 Drawing Figures

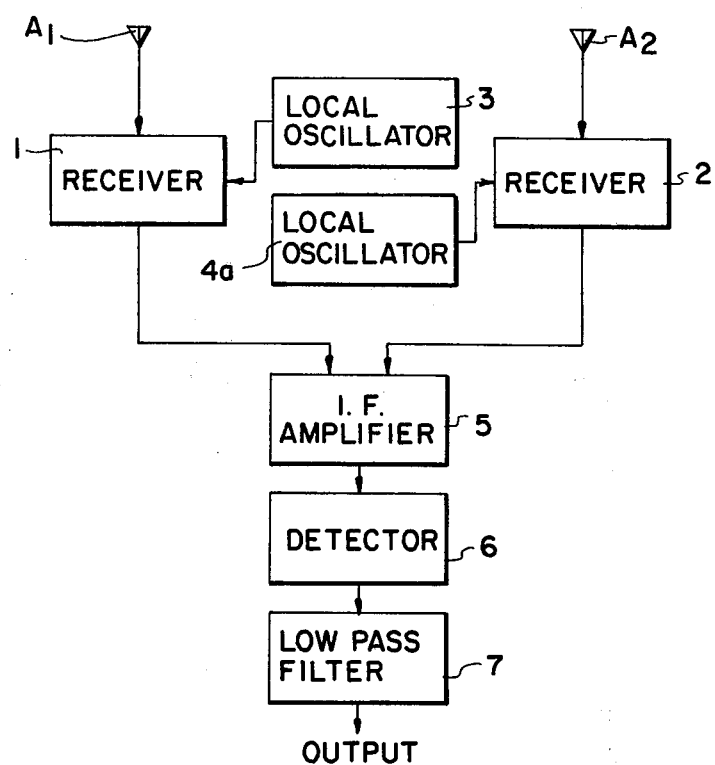

PULSE SIGNAL RECEIVING SYSTEM EMPLOYING SPACE DIVERSITY

This is a Continuation of application Ser. No. 626,097 filed Oct. 28, 1975, now aband.

BACKGROUND OF THE INVENTION

The present invention relates to a diversity receiving system. In particular, it relates to a receiving system mounted on a vehicle or carried by a man for reliably receiving a signal modulated by a pulse signal.

DESCRIPTION OF THE PRIOR ART

When an electromagnetic wave is transmitted from a vehicle or the like, electromagnetic waves are received which have been reflected by the often complex topography. Accordingly, fading occurs and this results in periodic dips or valleys in the electric field strength of the received signal depending on the wavelength involved and the speed of the vehicle. An error is thus produced in transmitting a pulse signal. An object of the present invention is to overcome the above difficulty.

It has been suggested in the prior art to arrange receiving antennas at two spaced locations and combine their outputs in a single receiver. However, such a system merely causes a change in the shape of the faded-signal waveform and is not an effective solution to the problem. It has also been suggested to receive and detect by the use of two receivers located at separate places and to selectively take the output of the receiver having the higher S/N ratio. This system has the disadvantages that noise which occurs upon switching, may cause an error and that a complex device is required for determining the higher S/N ratio and for switching thereto.

It is an object of the present invention to provide a receiving system which overcomes the above difficulties.

The above and other objects, features and advantages of the present invention will become more apparent from the following detailed description of a preferred embodiment of the invention when taken in conjunction with the accompanying drawings.

BRIEF DESCRIPTION OF THE DRAWINGS

FIG. 3 is a block diagram showing another embodiment of the present invention in which two local oscillators are employed.

DETAILED DESCRIPTION OF THE PREFERRED EMBODIMENT

An embodiment of the present invention will now be explained with reference to the drawings.

Figure 1:
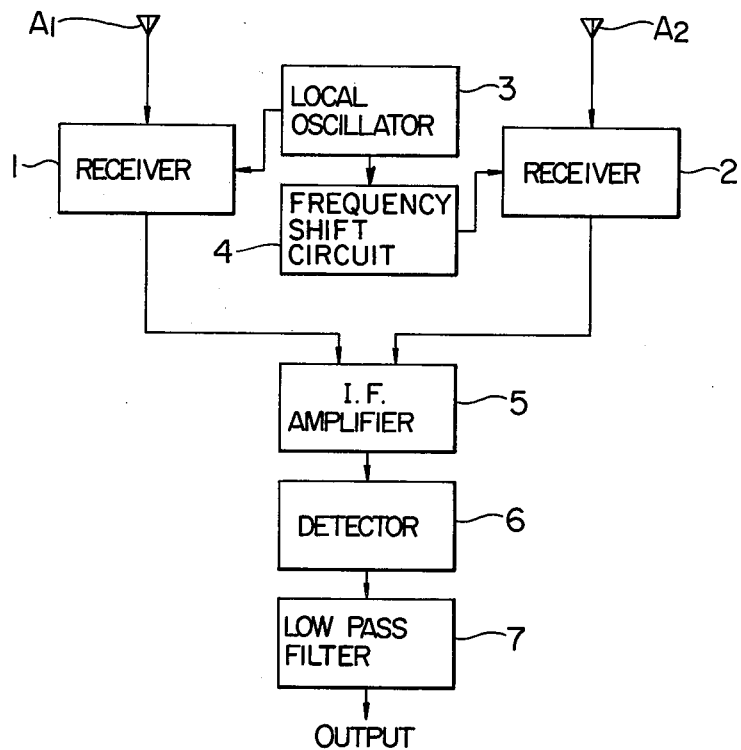
FIG. 1 is a block diagram showing the construction of a receiving system for receiving a signal modulated by a pulse in accordance with an embodiment of the present invention.

In FIG. 1, separate receivers 1 and 2 are coupled to antennas $A_1$ and $A_2$, respectively, which are spaced from each other by, for example, at least several wavelengths. A local oscillator 3 and a frequency shift circuit 4 are provided. The receivers 1 and 2 are supplied with local oscillation frequencies which are slightly frequency shifted from each other by the frequency shift circuit 4. The frequency shift circuit receives an output of the local oscillator 3 and shifts the frequency of this output. The frequency shift circuit can also be a separate local oscillator 4a as shown in FIG. 3, the frequency of which is slightly different from that of the local oscillator 3. When an NRZ (non-return to zero) modulating signal of 600 bits/sec is to be received, for example, the amount of the frequency shift must be at least 300 Hz which corresponds to the fundamental frequency thereof. That is, the fundamental frequency of the information signal modulating the received high frequency carrier signal is the lowest frequency component of this signal. When the modulating signal is an NRZ signal of 600 bits/sec, the fundamental frequency is 300 Hz. The upper limit of the shift amount should be within a range beyond which the sideband signal spreads beyond the receiver band width resulting in reduction in sensitivity.

More particularly, the band widths of the receivers are set to be slightly broader than the minimum band width required for receipt of the transmission or they are set such that the center frequencies thereof are slightly frequency shifted from each other. The local oscillation frequencies supplied to the respective receivers are frequency shifted from each other by at least the fundamental frequency of the modulating pulse or digital signal. An intermediate frequency amplifier circuit 5 combines and amplifies the intermediate frequency signal outputs from receivers 1 and 2. A detector circuit 6 detects the output from the intermediate frequency amplifier circuit. A low pass filter 7 is provided to produce a detected output which is free from a pip.

The signal modulation system may employ any type of modulation such as amplitude modulation, frequency modulation, phase modulation and the like. More satisfactory result may be obtained when three or more receiver and antenna sets are used.

With the above receiving and detecting system, highly reliable signal reception which is free from the effects of fading is attained.

Figure 2:
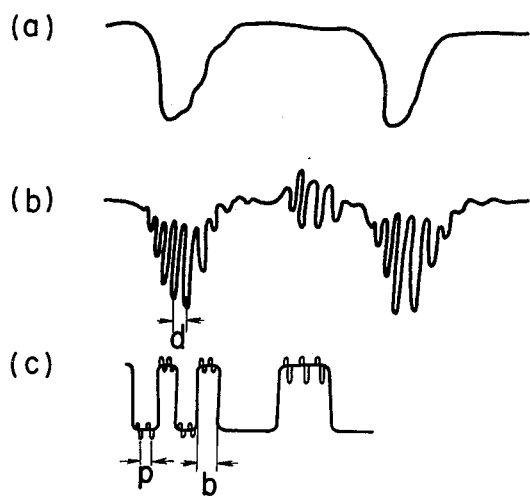
FIG. 2, a–c, illustrates waveforms which are useful in explaining the operation thereof.

The principle of the above system is explained below. When a wave bearing Rayleigh fading is received by antennas located at two different places, Rayleigh fading waves which have a small correlation with each other are developed. If those waves are directly combined, a Rayleigh fading wave of different waveform appears (see FIG. 2(a)). Therefore, such a system is not effective to suppress fading. In the present invention, since the receiving system causes a difference in the intermediate frequencies, the combined output includes a beat at a differential frequency of the intermediate frequencies as shown in FIG. 2(b). As a result, even in a dip or valley region of the combined output waveform, a high electric field appears at the period of the beat frequency. Since the frequency difference between the local oscillators is selected to be not less than the fundamental frequency of the modulating signal, the separation d between peaks of the beat is smaller than a minimum pulse width b of a signal to be transmitted, for example, a width of the minimum unit of a signal to be transmitted corresponding to one bit width as shown in FIG. 2(b).

For example, supposing that the frequency difference of the two local oscillators is $\Delta F$, the signals which have been respectively converted into intermediate frequency signals by the two local oscillators also have a frequency difference of $\Delta F$. When the two intermediate frequency signals are combined, the combined output signal shown in FIG. 2(b) has been amplitude modulated by a period of 1/ΔF. The period of 1/ΔF corresponds to the separation d. The separation d is equal to the width p in FIG. 2(c). The pips are produced in the output of the detector 6 at each instant the magnitude of the combined output of the IF amplifier 5 including the beat decreases below the detector threshold. In other words, the pips are produced in the detector output with a frequency corresponding to the beat frequency. Thus, the output shown in FIG. 2(c) is produced, and the pip of width p due to the beat is eliminated by the low pass filter 7 so that the signal can be received without error. If the frequency difference is less than the fundamental frequency, the separation between peaks of the beat is wider than the minimum pulse width b of a signal to be transmitted, for example, a width of the minimum unit of the signal to be transmitted corresponding to one bit width and the pip cannot be eliminated. When dips or valleys of the inputs to the receivers 1 and 2 occur simultaneously, the present system cannot prevent the fading effect, but such possibility will be small when two antennas are spaced from each other, and will be even smaller when three or more receiver sets are used. In this manner the possibility of the occurrence of error due to fading can be minimized and a highly reliable receiving system is attained.

On the other hand, if signals received by two antennas are simply combined, the resulting output will be very small when both signals are of the same amplitude and opposite phase or when both signals are very small simultaneously. The probability distribution thereof is a Rayleigh distribution which is similar to that obtainable from a single antenna receiving system. In contrast, in the present invention, although there exists a possibility that the combined electric field may be low when the inputs to two receivers are of the same amplitude, an advantageous result may be obtained since the amplitude of the beat is maximum at that time.

Even if two antennas are located in proximity the same effect is obtained if the polarization planes thereof are changed such that the correlation therebetween is minimized.

As described hereinabove, the present invention presents a significant advantage in that the reduction in the electric field due to fading can be suppressed by a relatively simple construction to prevent transmission error in a high speed transmission signal such as a pulse signal.

We claim:

1. A system for receiving a high frequency carrier signal modulated by a modulating signal comprising:
   at least two antennas spaced from each other for receiving said high frequency modulated carrier signal,
   local oscillator means for generating two different local oscillating signals, the frequency difference between said local oscillating signals being not less than the fundamental frequency of said modulating signal,
   two receivers respectively coupled to said antennas and to said local oscillator means for generating respective intermediate frequency signals, and
   amplifier means coupled to said receivers for combining said intermediate frequency signals, the resultant output signal from said amplifier means having pulsations of amplitude with a beat frequency corresponding to said frequency difference between said local oscillating signals and being produced in a region corresponding to an amplitude valley region which would otherwise be caused when the outputs of said two antennas are combined, such that said pulsations produce an amplitude of said output signal in said valley which may be subsequently detected, said frequency difference causing the period of said pulsations to be smaller than the minimum signal width contained in said modulating signal, and
   detector means to detect said resultant output signal to produce a demodulated signal.

2. A receiving system according to claim 1, wherein said modulating signal is a pulse signal and said period of said pulsations is smaller than the minimum pulse width contained in said pulse signal.

3. A receiving system according to claim 2, wherein said local oscillator means comprises two separate local oscillators for generating said two different local oscillating signals respectively.

4. A receiving system according to claim 2, wherein said local oscillator means comprises a local oscillator and a frequency shift circuit, and said frequency shift circuit receives said local oscillator signal from said local oscillator and shifts the frequency thereof.

* * * * *